United States Patent
Gray, Jr. et al.

(10) Patent No.: US 8,647,405 B2
(45) Date of Patent: Feb. 11, 2014

(54) FILTER HOUSING FOR ACCOMMODATING A PLURALITY OF FILTER SIZES

(75) Inventors: Richard E. Gray, Jr., Henrietta, NY (US); Robert F. Schwarzenbek, Flemington, NJ (US)

(73) Assignee: Richard E. Gray, Jr., Henrietta, NY (US)

( * ) Notice: Subject to any disclaimer, the term of this patent is extended or adjusted under 35 U.S.C. 154(b) by 188 days.

(21) Appl. No.: 13/195,504

(22) Filed: Aug. 1, 2011

(65) Prior Publication Data

US 2013/0031884 A1 Feb. 7, 2013

(51) Int. Cl.
*B01D 45/00* (2006.01)

(52) U.S. Cl.
USPC .................. 55/481; 55/478; 55/490; 55/492; 55/506; 55/DIG. 31

(58) Field of Classification Search
USPC ............ 55/478, 481, 490, 492, 506, DIG. 31
See application file for complete search history.

(56) References Cited

U.S. PATENT DOCUMENTS

| 2,214,750 | A | | 9/1940 | Myers | |
|---|---|---|---|---|---|
| 2,473,006 | A | * | 6/1949 | Pollard et al. | 55/481 |
| 3,247,652 | A | * | 4/1966 | Annas et al. | 55/481 |
| 3,626,668 | A | | 12/1971 | Cardiff | |
| 6,843,820 | B2 | | 1/2005 | Kubokawa | |
| 7,364,602 | B2 | | 4/2008 | Wu et al. | |
| 7,789,928 | B2 | | 9/2010 | Stepp | |
| 2007/0108364 | A1 | | 5/2007 | Metheny | |
| 2009/0126679 | A1 | | 5/2009 | Hoffer | |
| 2010/0207407 | A1 | * | 8/2010 | Walker, Jr. | 294/19.1 |

* cited by examiner

*Primary Examiner* — Jason M Greene
*Assistant Examiner* — Karla Hawkins
(74) *Attorney, Agent, or Firm* — Brian B. Shaw, Esq.; Harter Secrest & Emery LLP

(57) ABSTRACT

A filter housing includes a duct having at least one registration flange and an access port sized to pass a plurality of seating rail assemblies. Each seating rail assembly is releasably engaged with the duct includes a seating flange. By locating the seating rail assembly at a particular distance from the registration flange, a channel of different sizes can be formed for receiving a filter having a corresponding dimension.

19 Claims, 4 Drawing Sheets

FILTER HOUSING FOR ACCOMMODATING A PLURALITY OF FILTER SIZES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

1. Field of the Invention

The present disclosure generally relates to retaining filters and more particularly to a filter housing for use in an HVAC duct, wherein the filter housing can operably accommodate any of a plurality of filters having different dimensions along the direction of flow in the duct.

2. Description of Related Art

Conventional forced air household furnaces or central air conditioners include a return duct to direct air into a central unit for conditioning by either heating or cooling the air and an outlet duct for distribution of the conditioned air from the central unit throughout the home. The return duct or other structure though which air flows typically incorporates a filter within the air stream for removing dust and other particulate matter from the air stream. As air passes through the filter, the matter is removed to prevent distribution through the home as well as to avoid contamination of the central unit.

Several types of filters exist for removal of matter from the air. The most common variety is a standard, rectangular panel replaceable filter, which is composed of a random arrangement of fibers. Panel filters are usually approximately one inch thick and are inserted into a correspondingly sized opening in the duct. These filters operate by trapping particles within the randomly oriented fibers. These filters are used in a majority of American homes and are able to capture large particles, thereby helping to protect the central units and minimize the amount of dust on the heating or cooling equipment. Once these filters become saturated with dirt, dust, and the like, the filters are removed from the duct and replaced with a new filter.

Alternatives to the replaceable panel filter include replaceable and/or reusable pleated filters, high efficiency pleated filters, high efficiency particulate air (HEPA) filters, and washable fiberglass filters. Each of these alternatives typically has a different thickness (dimension along the flow path). That is, all the filters are sized to fit within a cross section of a given duct (such as 14×16) but have thicknesses that can range from about one inch to 5 inches thick.

Another system for removing particles from air in a home heating or cooling system is an electronic air cleaner. Duct mounted electronic air cleaners typically use an electrostatic precipitation systems. Such systems are extremely efficient, especially in the 0.1 to 10 micron size range, and advantageously create a very low pressure drop. Because trapped particles on collecting plates can build up and reduce the electrostatic field and, hence, collection efficiency, the cleaners should be cleaned weekly or monthly. While electronic air cleaners are more effective than the above-described fiber-based filters (with the exception of HEPA filters), they are relatively very expensive by comparison. Currently, they also are designed as a separate special unit that is installed between the central unit and the return duct and have a width typically between four and six inches. The special unit cannot fit within the standard filter opening found in most return ducts and also require relatively complicated installation, which is typically performed by a professional.

Electronic air cleaners are sometimes known to include conventional fiber-based filters. These hybrid filters can have a dimension from approximately 3 inches to 5 inches along the flow path.

Each type of filter has advantages and disadvantages. However, as each filter size requires a unique fitting within the duct. Thus, once a consumer selects a given filter type, absent a rebuild of the ventilation system, the consumer is without the ability to change filter types.

There is a need for a filter housing that can accommodate different filter dimensions (as measured along the flow path), without requiring a modification of a ventilating duct. The need further exists for a filter housing that operably retains any of a variety of filter types having a common periphery, wherein the thickness of the filter may vary substantially between filter types.

BRIEF SUMMARY OF THE INVENTION

The present system provides a filter housing including a duct having a cross section extending along a longitudinal dimension, the duct including a first access port, a first registration flange extending into the cross section at a first position along the longitudinal axis, a second registration flange extending into the cross section at a different second position along the longitudinal axis; and a first removable seating rail assembly sized to pass through the first access port and releasably engage an inside surface of the duct longitudinally intermediate the first registration flange and the second registration flange, the first seating rail assembly including a seating flange extending into the cross section.

In one configuration, the first registration flange extends into the cross section of the duct substantially around the entire periphery of the duct. It is further contemplated the filter housing can include an access door moveable between a first position occluding the first access port and a second position opening the first access port. In addition, the duct can include a second access port at the same longitudinal position as the first access port.

In a further configuration, the filter housing includes a duct extending along a longitudinal axis, the duct having a first access port, a first registration flange projecting into the duct, a plurality of seating rail assemblies, each seating rail assembly including a seating flange extending transverse to the longitudinal axis and a spacing foot extending along the longitudinal axis and defining a predetermined length perpendicular to the seating flange; and a retaining mechanism on at least one of the duct and the seating rail assembly for releasably retaining one of the seating rail assemblies within the duct to operably receive a filter between the first registration flange and the seating flange.

Alternatively, the filter housing can include a duct extending along a longitudinal axis, the duct having a first access port, a plurality of seating rail assemblies, each seating rail assembly including a seating flange extending transverse to the longitudinal axis and a spacing foot extending along the longitudinal axis and defining a predetermined length perpendicular to the seating flange; and a retaining mechanism on at least one of the duct and the seating rail assemblies for releasably retaining the seating rail assemblies within the duct to operably receive a filter between the seating flange of the two seating rail assemblies.

In another configuration, the filter housing includes a duct having a given cross sectional area along a longitudinal axis; and a first registration flange projecting into the duct to define a second cross sectional area smaller than the given cross sectional area, wherein the duct having an access port for exposing the first registration flange.

The filter housing can also include a duct having a given cross section along a longitudinal axis, the cross section being generally rectangular and defined by a top wall, a bottom wall and a pair of spaced apart interconnecting side walls, wherein each of one of (i) the top and bottom walls and (ii) the side walls including an access port sized to pass a filter, the access ports being located at a common position along the longitudinal axis.

A method is provided for operably disposing one of a plurality of different filters within a length of a duct, by locating a first removable seating rail assembly within the duct at a predetermined distance from a first registration flange within the duct, the first seating rail assembly including a first seating flange; and passing one of the filters through an access port in the duct to locate a first surface of the filter adjacent to the first registration flange and a second surface of the filter adjacent to the first seating flange.

A further method is provided for operably disposing one of a plurality of different filters within a length of a duct, by locating a first removable seating rail assembly within the duct at a predetermined distance from a second seating rail assembly within the duct, the first seating rail assembly including a first seating flange and the second seating rail assembly including a second seating flange; and passing one of the filters through an access port in the duct to locate a first surface of the filter adjacent to the first seating flange and a second surface of the filter adjacent to the second seating flange.

An additional method is provided for operably disposing one of a plurality of different filters within a length of a duct, passing one of the filters through an access port in the duct to locate a first surface of the filter adjacent to a first registration flange in the duct and a second surface of the filter adjacent to the second registration flange in the duct.

BRIEF DESCRIPTION OF THE SEVERAL VIEWS OF THE DRAWING(S)

DETAILED DESCRIPTION OF THE INVENTION

Figure 1:
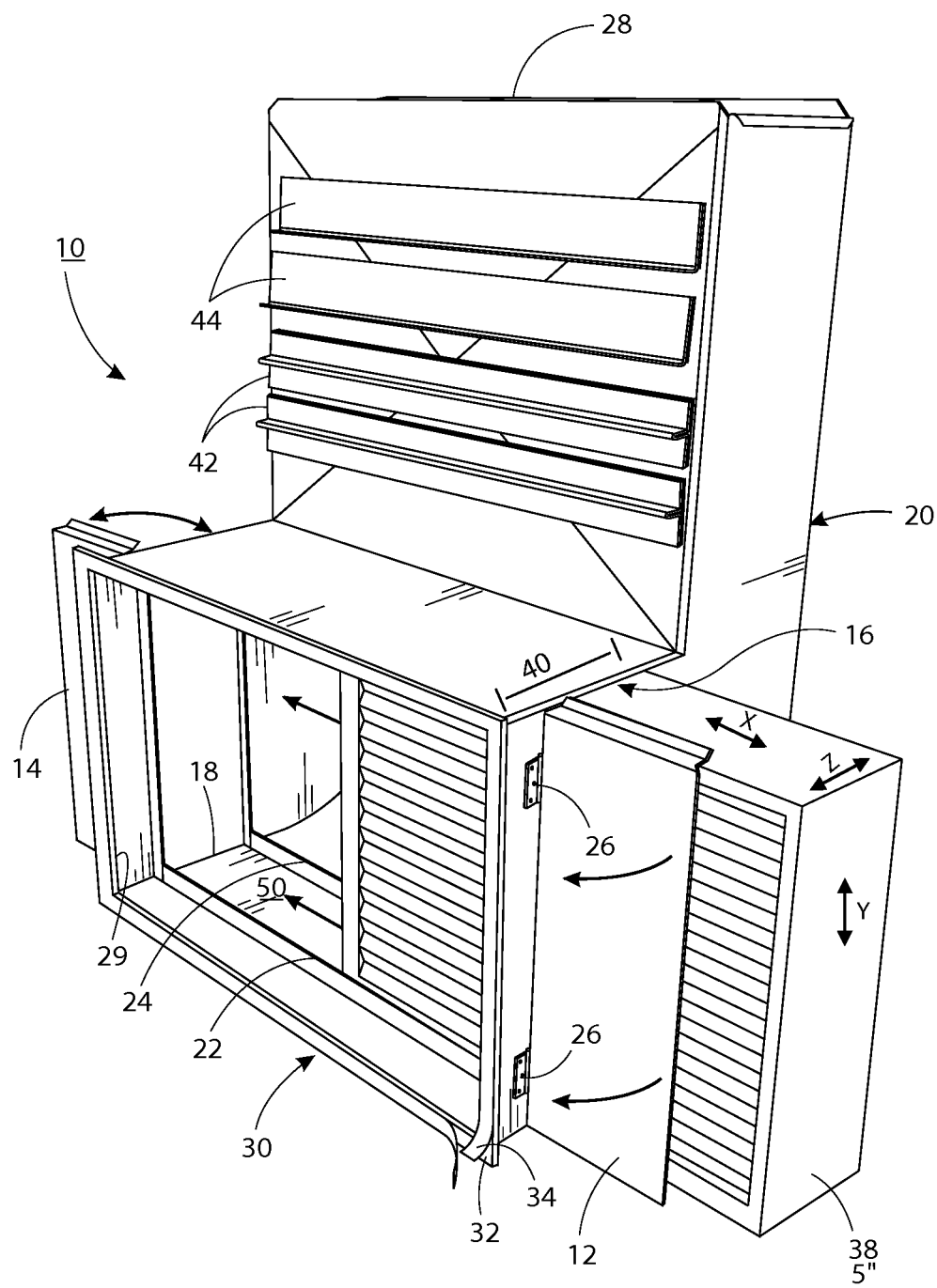
FIG. 1 is a perspective view of a filter housing located in a cold air return, the filter housing receiving a filter.

As seen in FIG. 1, a filter housing 10 is shown for selectively retaining any of a variety of filters 38 in a flow through a duct 40 of the filter housing, wherein removeably seating rail assemblies 42, 44 can be selectively used to locate and retain the filter.

The term flow is meant to encompass any gas flow such as conditioned air, as well as other gases or combinations of gases. For purposes of description, the flow is set forth as air.

For purposes of the description, the term filter 38 is used generically and is meant to encompass any device retained in the flow for treating the flow such as removing particulate matter from the flow. In one configuration seen in FIG. 1, each filter 38 has a peripheral frame 39 defining a common profile or footprint transverse to the flow. That is, each filter 38 is X inches wide and Y inches tall and Z inches along the direction of flow, wherein X and Y are common for all the relevant filters and Z changes depending on the particular type of filter. The peripheral frame 39 is typically impervious to the passage of air. The filter 38 can be pleated, conventional, electronic or a combination. That is, depending on the material of the filter 38, the filters can have different dimensions along the Z axis.

The filter housing 10 is configured to operably locate and retain any of a variety of filters 38 having a common peripheral profile, but having different thicknesses (dimension along the direction of flow in the duct). For purposes of description, the filters 38 are described as having thicknesses of approximately 1 inch, 2 inch, 3 inch, 4 inch and 5 inch—all with a common peripheral dimension and profile.

For purposes of description, the filter housing 10 is shown within a cold air return or boot 20. Although the filter housing 10 is shown as incorporated into the cold air return 20, it is understood, the filter housing can be located in or along any portion of a conduit or duct transmitting a flow of gas.

Generally, the cold air return 20 passes the air flows which are collected from the various individual room returns through a common duct and then to a central unit (not shown). The central unit can heat the air, cool the air or selectively provide both. Thus, the central unit can be an air conditioner, a furnace or a combination.

Thus, the cold air return 20 includes an inlet 28 for receiving air from the system and an outlet 29 for passing the received air to the central unit. It is understood, that the described interface with the central unit is not meant to the limit the filter housing 10, and that the filter housing could be located in any portion of a system passing a pressurized stream.

Further, the cold air return 20 is described in terms of an air flow from the inlet 28 to the outlet 29, and thus provide for description of location or directions in terms of upstream and downstream, with respect to the designed flow.

In one configuration, the inlet 28 and outlet 29 have substantially the same cross sectional area, however, the peripheries of the inlet and the outlet are different. As seen in FIG. 1, the inlet 28 has a rectangular periphery, wherein side walls are smaller than top and bottom walls, such that a ratio of top wall length to side wall length is greater than approximately 2. Referring to FIG. 1, the outlet 29 also has a rectangular periphery, wherein side walls are smaller than top and bottom walls, such that a ratio of top wall length to side wall length is less than approximately 2. It is understood these ratios are not limiting, but rather illustrative of the different profile between the inlet 28 and the outlet 29.

As seen in FIG. 1, the outlet 29 includes a predisposed seal assembly 30, having a seal 32 and a removable covering 34. The seal 32 is selected to form a sealed interface with the central unit. The seal 32 is a closed cell foam capable of sufficient compression to accommodate anticipated variances between the central unit and the cold air return 20 so as to maintain a substantially sealed interface. Both sides of the seal 32 can be covered with adhesive and a removable cover, such the cover along a first side of the seal can be removed and the seal applied to the outlet. Subsequently, during installation of the cold air return 20, the cover 34 on the other side of the seal 32 can be removed to expose the underlying adhesive for bonding to the central unit.

Referring to FIG. 1, the filter housing 10 includes the duct 40 intermediate the inlet 28 and the outlet 29, wherein the duct has a substantially constant cross section along a longitudinal axis, LA, of the duct. Although the duct 40 can be formed of any of a variety of materials, common commercially available materials include sheet metal and galvanized sheet metal. Similarly, the thickness of the commercially available materials depends on the intended operating environment of the duct 40. For example, the duct 40 can be formed of galvanized sheet metal having a thickness between approximately 16 gauge and 36 gauge.

In one configuration, the duct 40 has a substantially constant cross section along a longitudinal axis of the duct. The longitudinal axis extends between an upstream end and a downstream end of the duct. Typically, the duct 40 is substantially linear between the upstream end and the downstream end, and thus the longitudinal dimension extends along a linear longitudinal axis.

As seen in FIG. 1, the filter housing 10 includes a first registration flange 22 and a spaced second registration flange 24. In one configuration, each registration flange 22, 24 extends about an entire inner periphery of the cross section of the duct 40. That is, as the duct 40 defines a given cross sectional area, the registration flange 22, 24 projects into the cross sectional area and defines a smaller cross sectional area. Although the registration flanges 22, 24 are shown being substantially continuous about the inner periphery of the duct 40, it is understood the registration flanges can be formed with gaps.

In one configuration, the first registration flange 22 is downstream of the second registration flange 24. Thus, the first registration flange 22 is at a first position along the longitudinal axis and the second registration flange 24 is located at a different second position along the longitudinal axis. The registration flanges 22, 24 can be fixed relative to the duct 40 such as by being integrally formed with the duct or being fixedly attached to the duct such as by spot welding. It is also understood at least one of the registration flanges 22, 24 can be removeably connected to the duct 40. As with the duct 40, the registration flanges 22, 24 can be formed from a variety of materials and thicknesses.

In one configuration, the first registration flange 22 is spaced from the second registration flange 24 by a given distance along the longitudinal axis, wherein the given distance is equal to the corresponding dimension of the largest anticipated filter 38 to be operably located in the filter housing 10. Thus, in an exemplary configuration, the first registration flange 22 is spaced from the second registration flange 24 by a distance of approximately 5 inches.

The duct 40 includes a first access port 16 exposing the registration flanges 22, 24. The first access port 16 is sized to pass the desired filter 38 so as to locate the filter within the duct 40 intermediate the registration flanges 22, 24.

In one configuration, the duct 40 also includes a second access port 18, wherein the first access port 16 and the second access port are located along a common position along the longitudinal axis. That is, the first access port 16 and the second access port 18 are opposite each other in opposing walls at the duct 40. Thus, the access ports 16, 18 can be located in the sidewalls or the top and bottom walls of the duct 40.

By virtue of the first and second access ports 16, 18 being located at a common longitudinal position, the filter 28 can be removed and replaced from either side of the duct 40. Thus, the installation of the duct 40 is not dictated by consideration of required access from a specific side for changing of the filters 38.

Further, each the first and second access ports 16, 18 can be located adjacent or proximal to the corresponding registration flange 22, 24 such the upstream and downstream boundaries of the access ports are substantially defined by the registration flanges. It is understood the registration flanges can be fixed adjacent or proximal to the access ports or spaced from the access ports by a distance, typically less than a thickness of the filter 38.

As seen in FIG. 1, the filter housing 10 includes a first access door 12 and a second access door 14 for selectively occluding and opening the respective first access port 16 and the second access port 18. In one configuration, the access door is moveable between a closed position, occluding the access port, and an open position opening the access port for passage of the filter or seating rail assemblies. The access door is spring biased such as by a leaf or coil spring to the closed position.

Figure 2:
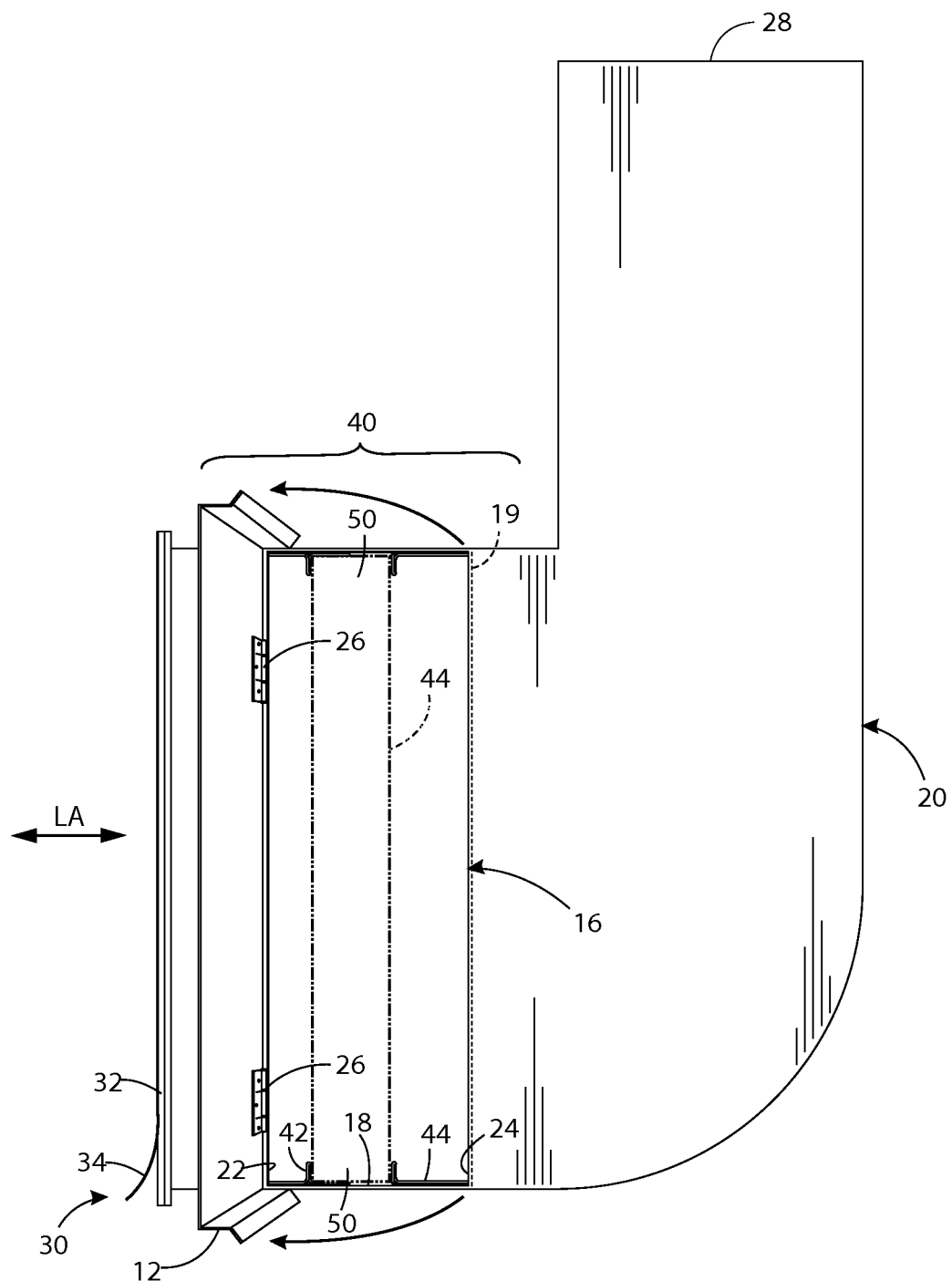
FIG. 2 is a side elevation view of the filter housing showing an open access port and a filter in phantom.
Figure 3:
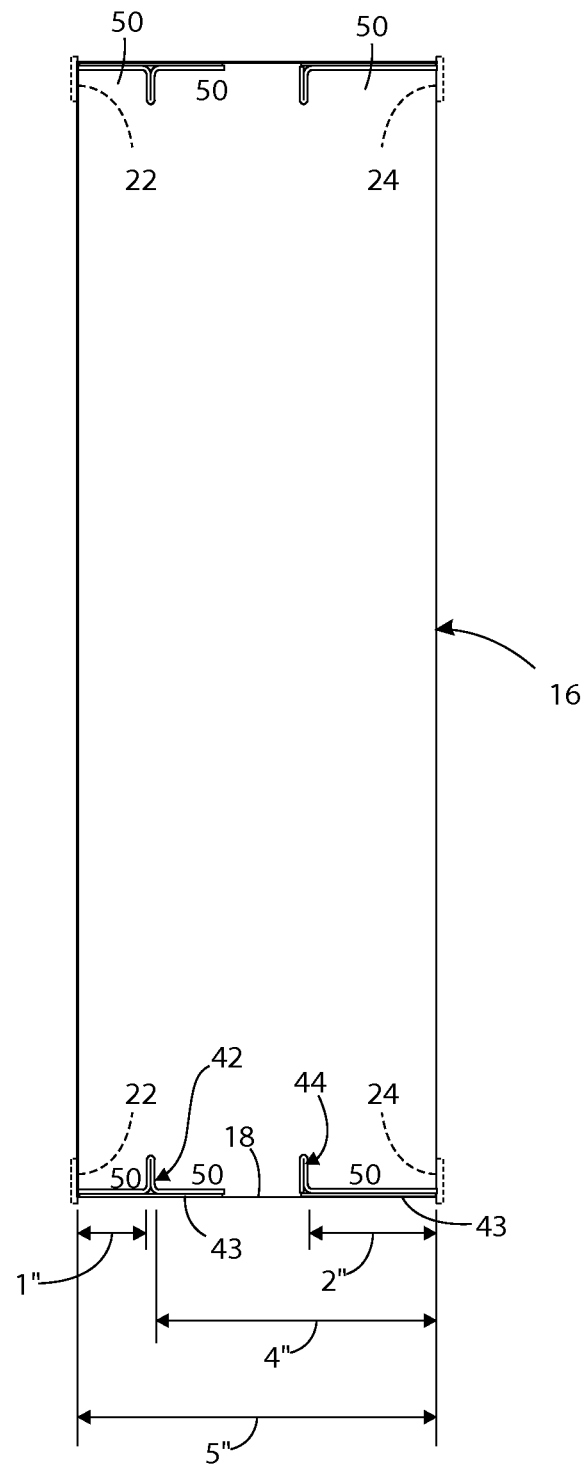
FIG. 3 is a side elevation view of a portion of the filter housing showing a first configuration of a plurality of operably located seating rail assemblies.
Figure 4:
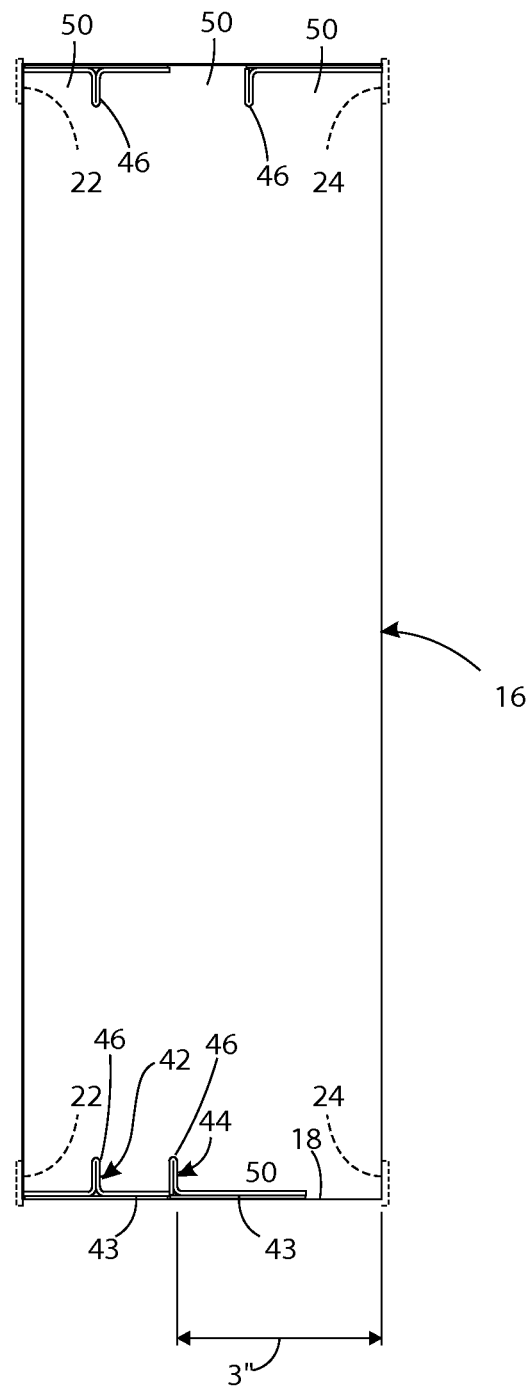
FIG. 4 is a side elevation view of a portion of the filter housing showing a second configuration of a plurality of operably located seating rail assemblies.

The filter housing 10 further includes a plurality of seating rail assemblies 42, 44, shown releasably engaged with the cold air return 20 in FIG. 1 and operably located in FIGS. 2-4.

Each seating rail assembly 42, 44 includes a seating flange 46 extending transverse to the longitudinal axis and a spacing foot 48 extending along the longitudinal axis and defining a predetermined length perpendicular to the seating flange. Thus, the seating rail assembly 42, 44 can have a generally T, L or E shaped cross section. However, it is understood other cross sections can be employed.

Each seating rail assembly 42, 44 is sized to pass through the access ports 16, 18 and releasably engage the duct 40, intermediate the registration flanges 22, 24. The engagement of the seating rail assembly 42, 44 and the duct 40 can be provided by a variety of mechanisms, such as but not limited to magnetic, adhesive or mechanical fastening including detents or friction fit. For example, in connection with the duct 40 formed of sheet metal, each seating rail assembly 42, 44 can include a bonded magnetic backing or layer 43, wherein the magnetic layer is magnetically attracted to the sheet metal of the duct to operably retain the seating rail assembly.

It is further contemplated that the mechanism for retaining the seating rail assembly relative to the duct can be affixed to either of the duct or the seating assembly. Alternative, the mechanism can be independent and cooperatively retain the seating assembly relative to the duct, such as a magnetic strip that attracts the duct and the seating assembly.

As seen in FIGS. 2, 3, and 4, the engagement of seating rail assemblies 42, 44 in the duct 40 forms at least one channel 50, by virtue of the seating flange 46 of two assemblies or between the seating flange and one registration flange 22, 24, wherein the channel is sized to slideably receive a corresponding filter.

In one configuration, the seating rail assemblies 42, 44 include identical pairs of assemblies, such that one of the pair can be engaged with the duct along the interior surface of one wall of the duct 40 and the remaining one of the pair can be retained along the interior surface of the opposing duct wall. Thus, one of the pair of seating rail assemblies 42, 44 is passed through the access ports 16, 18 to engage the bottom wall and the remaining one of the pair is passed through the access port to engage the top wall. However, it is understood the seating rail assemblies 42, 44 can be engaged with the access doors 12, 14 to operably locate the respective filter 38. For purposes of description, the seating assemblies 42, 44 are shown as operably engaged with the top and bottom walls of the duct 40. Further, the seating rail assemblies 42, 44 are shown as extending across substantially the entire width of the duct 40. However it is understood the seating rail assemblies 42, 44 may extend less than the entire width of the duct 40.

Through the selection of the size of the spacing foot 48, the seating rail assemblies 42, 44 can be used to define a distance between one of the registration flanges 22, 24 and the seating flange 46 sized to accommodate any of the given filter sizes. Referring to FIG. 2, a first pair of the seating rail assemblies 42 is attached to the duct so that the spacing foot contacts the down stream registration flange 22. This pair of seating rail assemblies 22 has a one inch dimension from along the spacing foot 48 to the seating flange 46. Thus, the channel 50 has a one inch dimension along the direction of flow is formed between the seating flange 46 and the registration flange 22, such that a one inch filter can be slide into the channel. The registration flange 22 abuts the peripheral frame 39 of the filter 38 along the downstream side of the filter, and the seating flange 46 contacts the peripheral frame along the upstream side of the filter.

Referring to FIGS. 2 and 3, the second set of seating rail assemblies 44, having a different spacing foot dimension, can be passed through the access ports 16, 18 and engaged within the duct 40 to define the channel 50 as having a three inch dimension along the longitudinal axis LA.

As seen in FIGS. 3 and 4, by orienting the seating rail assemblies 42, 44, a plurality of different sized channels 50 can be formed for operatively receiving and retaining corresponding filters 38.

Alternatively, the channel 50 for operatively receiving and retaining the corresponding filter 38 can be defined by spaced seating rail assemblies 42, 44 within the duct 40. Thus, the channel 50 for operatively receiving and retaining the corresponding filter 38 can be defined by (i) one registration flange 22 or 24 and one spaced seating rail assembly 42 or 44; (ii) a pair of spaced seating rail assemblies 42, 44 retained in the duct 40; or (iii) the spaced registration flanges 22, 24.

The registration flanges 22, 24 and the seating flange 46 are sized to engage the peripheral frame 39 to substantially preclude flow between the peripheral frame, the registration flange and the seating flange—thereby maintaining flow through the filter 38.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A filter housing releasably receiving a filter, the filter housing comprising:
   (a) a duct having a longitudinal axis, an inlet and an outlet spaced from the inlet along the longitudinal axis, the duct having a cross section extending along the longitudinal axis, the duct including a first access port transverse to the longitudinal axis;
   (b) a first registration flange extending into the cross section at a first position along the longitudinal axis;
   (c) a second registration flange extending into the cross section at a different second position along the longitudinal axis, the first access port being longitudinally intermediate the first registration flange and the second registration flange; and
   (d) a first removable seating rail assembly sized to pass through the first access port and releasably engage an inside surface of the duct longitudinally intermediate the first registration flange and the second registration flange, the first seating rail assembly being separate from the filter and including a seating flange extending into the cross section.

2. The filter housing of claim 1, wherein the first registration flange extends into the cross section of the duct substantially around an entire inner periphery of the duct.

3. The filter housing of claim 1, further comprising an access door moveable between a first position occluding the first access port and a second position opening the first access port.

4. The filter housing of claim 1, wherein the duct includes a second access port at the same longitudinal position as the first access port.

5. The filter housing of claim 4, further comprising a first access door moveable between a first position occluding the first access port and a second position opening the first access port and a second access door moveable between a first position occluding the second access port and a second position opening the second access port.

6. The filter housing of claim 1, wherein the first and the second registration flanges are fixed relative to the duct.

7. The filter housing of claim 1, wherein the duct is integral with a cold air return, the cold air return having an inlet of a first cross sectional profile and an outlet of a different second cross sectional profile, wherein the duct is intermediate the inlet and the outlet.

8. The filter housing of claim 1, wherein one of the first registration flange and the second registration flange form a substantially air tight seal with the filter under operating pressures in the duct.

9. A filter housing for releasably retaining a filter, the filter housing comprising:
   (a) a duct extending along a longitudinal axis, the duct having a first registration flange for operably engaging the filter, the first registration flange extending transverse to the longitudinal axis and a first access port;
   (b) a plurality of separate seating rail assemblies, each seating rail assembly including a seating flange extending transverse to the longitudinal axis and a spacing foot extending along the longitudinal axis and defining a predetermined length perpendicular to the seating flange; and
   (c) a retaining mechanism on at least one of the duct and the seating rail assemblies for releasably and independently retaining the seating rail assemblies within the duct to define a channel sized to receive the filter between the seating flange and the first registration flange.

10. The filter housing of claim 9, wherein one of the seating rail assemblies contacts a filter in the duct.

11. The filter housing of claim 9, wherein the first registration flange extends substantially about an inner periphery of the duct adjacent to the first access port.

12. The filter housing of claim 9, further comprising a second registration flange in the duct.

13. The filter housing of claim 9, wherein the retaining mechanism includes a magnetic element.

14. The filter housing of claim 9, further comprising a seal about an outlet of the filter housing.

15. A filter housing comprising:
(a) a duct having an upstream end, a downstream end and a constant given cross sectional area along a longitudinal axis between the upstream end and the downstream end; and
(b) a first registration flange longitudinally spaced from the upstream end and the downstream end and projecting into the duct intermediate the upstream end and the downstream end to define a second cross sectional area smaller than the given cross sectional area;
the duct having an access port intermediate the upstream end and the downstream end exposing the first registration flange.

16. The filter housing of claim 15, further comprising a first access door moveable between a first position occluding the first access port and a second position opening the first access port.

17. The filter housing of claim 15, wherein the first registration flange extends about substantially an entire inner periphery of the duct.

18. The filter housing of claim 15, further comprising a first seating rail assembly having a seating flange, the first seating rail assembly sized to pass through the access port.

19. The filter housing of claim 18, wherein the first seating rail assembly contacts a filter in the duct.

* * * * *